July 7, 1936.  J. R. SNYDER  2,046,794
SHOCK ABSORBER
Filed June 21, 1932  3 Sheets-Sheet 1
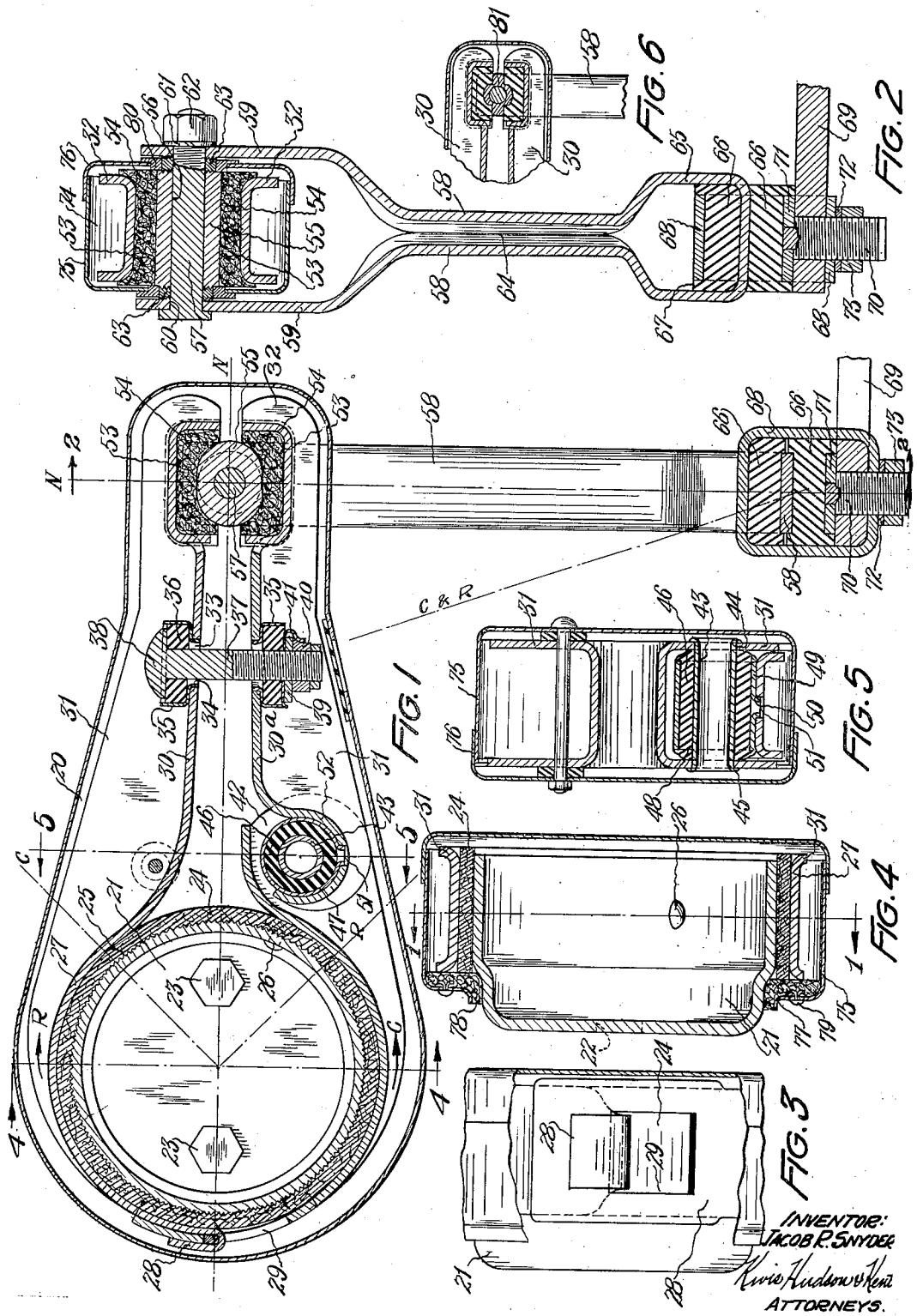
INVENTOR:
JACOB P. SNYDER
Rivis Hudson & Kent
ATTORNEYS.

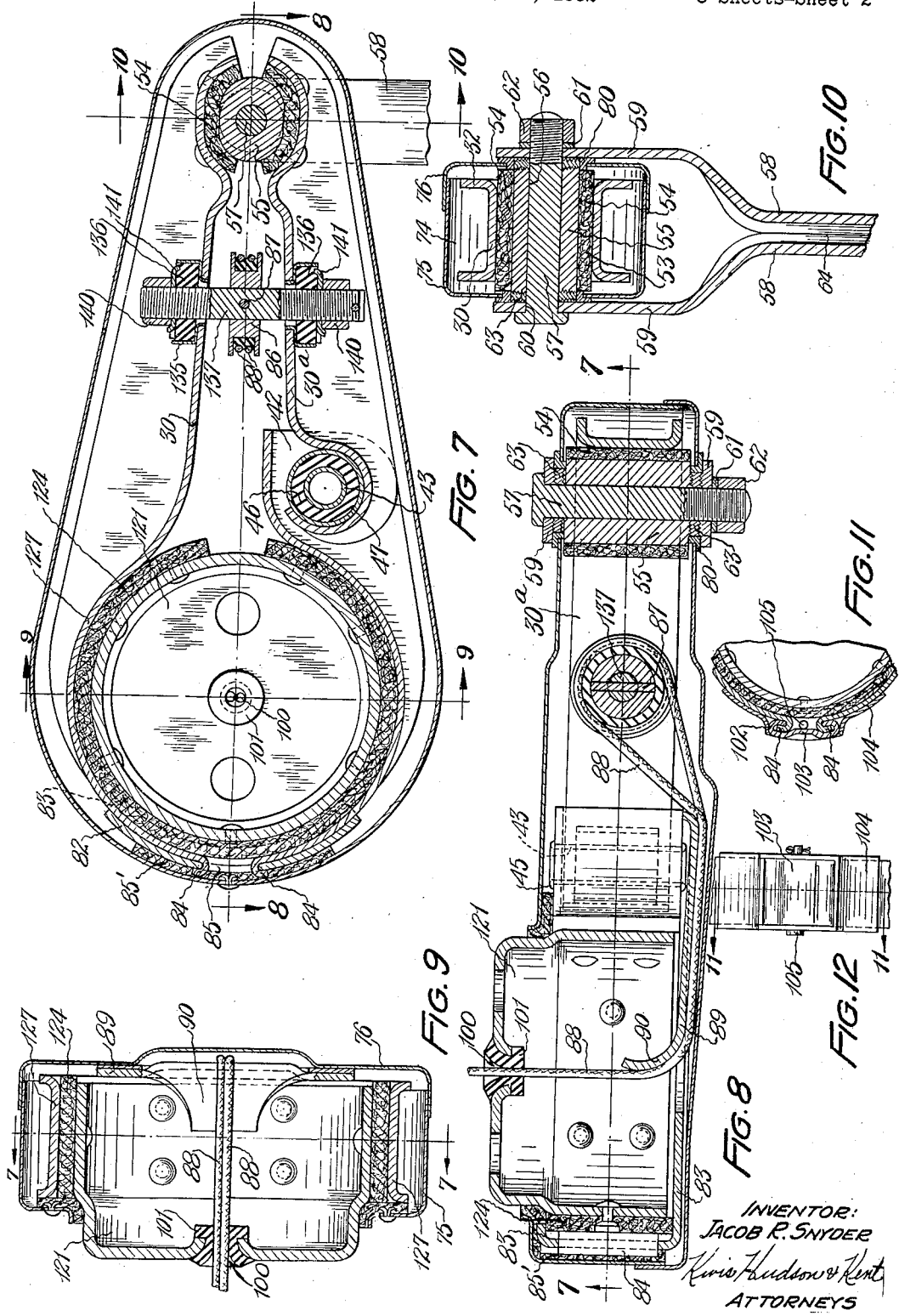

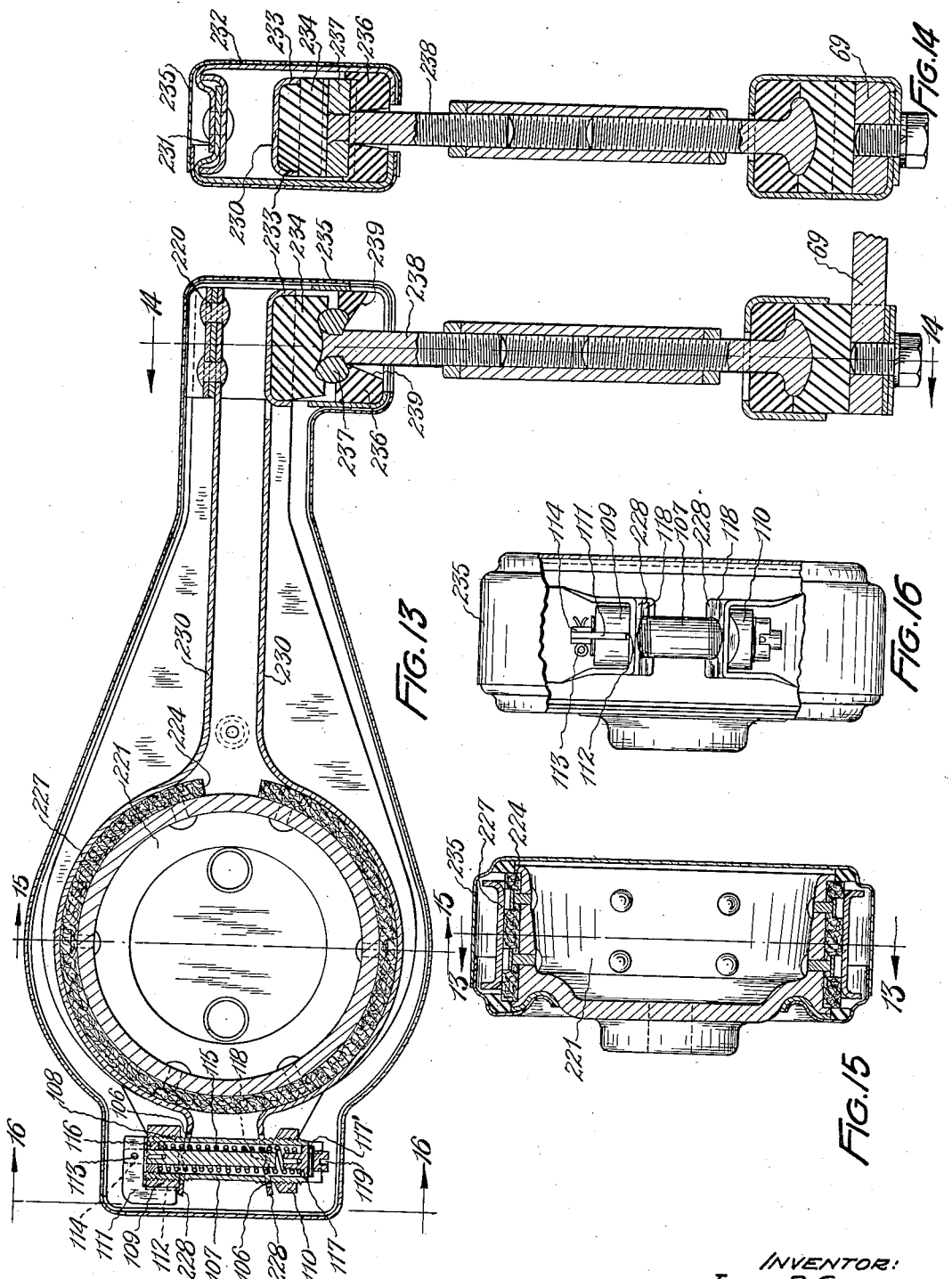

Patented July 7, 1936

2,046,794

UNITED STATES PATENT OFFICE 2,046,794

SHOCK ABSORBER

Jacob Rush Snyder, Cleveland, Ohio

Application June 21, 1932, Serial No. 618,428

19 Claims. (Cl. 188—130)

This invention relates to shock absorbers, preferably for use upon motor vehicles, for controlling the chassis movements with respect to the axles throughout their entire range of relative movements and has for one of its objects to provide a shock absorber which is simple in construction, efficient in operation and inexpensive to manufacture.

Another object of the invention is to produce a shock absorber of the frictionally resisting type wherein progressively increasing resistance is effected between the relative movements of the chassis and axle from a neutral position to the maximum positions in opposite directions.

A further object of the invention is to provide for a greater increasing frictional resistance to the rebound movement between the chassis and axle where it is more necessary than to the compression movement between the chassis and axle.

A further object of the invention is to produce a shock absorber of the type referred to in which there is no metal to metal contact and which requires no lubrication for the operating elements.

A further object of the invention resides in providing a friction drum which may be renewed or replaced.

A further object of the invention resides in constructing the shock absorber in such a manner and attaching the same to the motor vehicle that vibration noises are dampened and not transmitted to the chassis.

A further object of the invention resides in providing compensating means for taking up the wear between the friction members and also at the drag link connection.

With the objects above indicated and other objects hereinafter explained in view, the invention consists in the construction and combination of elements hereinafter described and claimed.

Referring to the drawings:

Figure 1 is a longitudinal sectional view in elevation showing the preferred construction of a shock absorber embodying the present invention;

Fig. 2 is a sectional view taken on line 2—2 and showing the drag link connection in detail;

Fig. 3 is a fragmentary end view of the shock absorber with a portion of the housing broken away to show the connection of one of the friction members;

Fig. 4 is a transverse sectional view taken on line 4—4 of Fig. 1;

Fig. 5 is a transverse sectional view taken on line 5—5 of Fig. 1;

Fig. 6 is a fragmentary sectional view of a modified form of connection between the drag link and shock absorber;

Fig. 7 is a longitudinal sectional view in elevation showing a modified form of a shock absorber embodying the invention;

Fig. 8 is a longitudinal sectional view in plan, taken on line 8—8 of Fig. 7;

Fig. 9 is a transverse sectional view taken on line 9—9 of Fig. 7;

Fig. 10 is a transverse sectional view taken on line 10—10 of Fig. 7;

Fig. 11 is a fragmentary sectional view of a modified form of the shock absorber embodying the invention;

Fig. 12 is an end view of that shown in Fig. 11;

Fig. 13 is a longitudinal sectional view in elevation showing a modified form of shock absorber embodying the present invention;

Fig. 14 is a transverse sectional view taken on line 14—14 of Fig. 13;

Fig. 15 is a transverse sectional view taken on line 15—15 of Fig. 13;

Fig. 16 is a transverse sectional view in elevation taken on line 16—16 of Fig. 13.

In the drawings, 20 indicates generally a shock absorber embodying the present invention, the preferred construction of which is illustrated in Fig. 1. A drum 21 is provided preferably in the form of a metal stamping, being cup-shaped, as shown more clearly in Fig. 4, and the closed side is provided with transverse openings 22 adapted to receive bolts 23 for rigidly attaching the drum to the chassis of a motor vehicle. A friction member 24 of brake lining or rubberized material in the form of a continuous band, extends around the peripheral surface of the drum 21 and is prevented from relative rotation with respect thereto by serrations 25, which are produced in the outer surface of the band more clearly shown in Fig. 1. A rivet 26 extends through the drum and friction band 24 to prevent axial movement of the friction band upon the drum. The friction band 24 is preferably forced over the drum in assembling the same thereon so that the serrations will cut into the inner surface of the friction band. This construction provides for an inexpensive replacement in the event that the friction band receives unusual wear.

An expansible and contractible metallic friction member 27 is formed to engage the outer surface of the friction band 24 and is movable in opposite directions about the axis of the drum 21. The metallic friction member 27 is formed of cooperating half sections which are flexibly connected together by means of a U-shaped tongue 28 provided upon one of the sections which extends through an opening 29 provided in the adjacent end of the other section, more clearly shown in Figs. 1 and 3. The friction member 27 is of a width substantially the same as the width of the friction band 24 so that sufficient frictional resistance is provided in connection with the operation of the shock absorber. The friction member 27 at its opposite side has upper and lower laterally extending free ends or arms 30 and 30a which project from the respective cooperating half sections. One of the arms, preferably the upper arm 30, is integral with the corresponding half section of the member 27, while the lower arm 30a is pivoted to the lower half section of the member 27, as will be explained hereinafter. The cooperating half sections also have longitudinally extending flanges 31 formed integral therewith and extend along the outer edges thereof, as more clearly shown in Figs. 2 and 5, the flanges terminating at 32 adjacent the left hand, as shown in Fig. 1, so as to provide sufficient flexibility to permit the cooperating half sections to be moved into engagement with the friction band 24.

The arms 30 and 30a, at a point between the drum 21 and the ends of the arms, are provided with aligned openings 33 within which are secured the reduced ends 34 of cup-shaped members 35. Resilient washers or blocks 36 of brake lining or rubberized material are disposed within the cup-shaped members 35 and have aligned openings through which a screw threaded bolt 37 extends, the head 38 of the bolt engaging the upper resilient washer 36, while a washer 39 engages the lower resilient washer 36 and is secured in place by means of a nut 40 which cooperates with the screw threaded end of the bolt and is adjustable thereon to position the arms 30 and 30a in the desired spaced relation. A locking member 41 for the nut 40 may be provided so as to prevent accidental disengagement of the nut. It will be noted from the construction that sufficient clearance is provided between the cooperating elements so that metal to metal contact is eliminated, resulting in a noiseless construction and one which does not need lubrication. This connection functions normally as a fulcrum point about which the arms pivot in their relative movement, as will be later more fully described, and also is a compensating means for taking up the wear which occurs as a result of the frictional engagement in the relative movements between the friction member and the friction band.

The lower arm 30a, as shown in Fig. 1, is pivotally jointed at 42 between the drum 21 and the ends of the arms to render the operation of the shock absorber more sensitive to the movements between the chassis and axle of the motor vehicle. The construction of the pivoted joint 42 is more clearly shown in Fig. 5 and consists of a transversely extending hollow tube or pin 43, the outer ends of which extend through aligned openings 44 provided in the flanges 31 of the portion of the arm adjacent the drum 21, the outer ends of the tube 43 being peened over at 45 to securely hold the pin against displacement. A resilient cylindrical member 46 of brake lining or rubberized material has a transverse opening 47 to receive the tube 43 upon which it is supported and has laterally extending flanges 48 at its opposite ends of a diameter larger than the diameter of the cylindrical member 46. A metal band or sleeve 49 encircles the resilient member 46 and is disposed between the flanges 48 thereof. The band 49 has a projection 50 preferably stamped therein which cooperates with an opening 51 in a looped portion 52 of the arm 30a, as shown in Fig. 1, the looped portion receiving and supporting the metal band 49 so as to prevent relative movement therebetween. Here again it will be noted that the construction of the joint 42 is such that no metal to metal contact occurs, thus rendering the joint noiseless and requiring no lubrication between the operating parts.

The free ends of the arms 30 and 30a are pressed outwardly to provide recesses 53 within which are secured resilient blocks 54 of brake lining or rubberized material, the inner adjacent surfaces of which are cut away to receive a cam member 55 of substantially oval shape, which has a longitudinally extending opening 56 for loosely receiving therein a shank of a screw threaded bolt 57.

A drag link 58 is formed of a piece of flat metal bent to substantially U-shape and having its free ends 59 extending in parallel spaced relation and adapted to receive therebetween the end of the shock absorber adjacent the cam 55. The free ends 59 are provided with aligned openings 60 to receive the bolt 57, the head of the bolt engaging one of the ends 59 while the washer 61 engages the other end 59 and is secured in place by means of a nut 62. Washers 63 having serrations upon their opposite sides are provided with openings through which the bolt 57 extends and are positioned between the inner surfaces of the arms 59 and the adjacent surfaces of the cam 55, as is more clearly shown in Fig. 2. It is important that the cam 55 be movable with the drag link 58 about the axis of the bolt 57 and, as a result, the tightening of the nut 62 causes the serrations on the washers 63 to rigidly engage the contacting surfaces. This construction is of material importance in attaching the shock absorber to the motor vehicle and the manner of attaching will be later more fully described.

The drag link 58 adjacent the central portion has its arms bowed inwardly at 64 to reinforce the same and, at the same time, are in abutting welded or riveted engagement while the lower portion is looped at 65. Resilient blocks 66 of brake lining or rubberized material are positioned one within the looped portion 65 and one below the looped portion 65, as clearly shown in Figs. 1 and 2, and have flanges 67 adjacent their outer sides between which extends a metal sleeve 68. This metal sleeve 68 extends circumferentially around the blocks 66 and an extension 69 attached to or forming part of the axle of the motor vehicle, the upper surface being in engagement with the lower blocks 66. A set screw 70 extends through a threaded opening in 69 and has a washer 71 attached thereto or formed integral therewith, which is located between the flanges of the lower block 66 and the upper side of the member 69. A lock washer 72 engages the underside of the sleeve 68 and is held in place by means of a nut 73. It will be seen that this construction eliminates all metal to metal contact between movable parts and, as a result, the operation is noiseless and requires no lubrication.

A housing 74 in the form of a stamping encloses the elements of the shock absorber proper and comprise a U-shaped member 75 and a cooperating U-shaped cover member 76. The member 75 adjacent the drum is cut away and flared outwardly at 77 through which the closed end of the drum 21 may extend and brake lining or rubberized material 78 is provided between that portion of the member 75 and the drum 21 to prevent the admission of dirt and moisture. This brake lining may be secured to the member 75 by means of rivets 79, as more clearly shown in Fig. 4. Adjacent the drag link connection the members 75 and 76 are provided with aligned openings within which are secured flanged fiber members 80 having aligned openings of sufficient diameter to loosely receive therein the washers 63.

In Fig. 6, a cam 81 of modified form with respect to the cam 55, as shown in Fig. 1, is illustrated being connected to the drag link arm 58 in a manner similar to that already explained with respect to the cam 55. Various types of cams may be employed, the purpose being to provide a means for progressively increasing the distance between the free ends of the arms 30 and 30a as the cam 55 is moved about the axis of the bolt 57 during the compression and rebound strokes of the shock absorber.

It is, of course, desirable in a shock absorber that greater resistance be offered to the rebound stroke than to the compression stroke, this having been determined by years of experience and tests in connection with the operation of shock absorbers of all types. It is further important that the resistance offered throughout the compression and rebound strokes be of a progressively increasing character. The present construction is an improvement over the types of shock absorbers which have been heretofore manufactured and fulfills all of the requirements which are essential in the production of a practical shock absorber. This shock absorber can be inexpensively manufactured, due to the fact that the shock absorber is of the frictionally resisting type and operates in the manner required due to the relationship of the operating elements.

In attaching the shock absorber to the motor vehicle, the nut 62 is backed off the bolt 57 so as to disengage the serrated washer 63 from the cam 55. The drum 21 is then bolted to the chassis of the motor vehicle by means of the bolts 23 and the lower end of the drag link 58 is connected with the extension 69 attached to the axle of the motor vehicle by means of the set screw 70 and nut 73. Irrespective of whether the arms 30 and 30a of the shock absorber are in a horizontal plane or whether the drag link 58 is in a vertical plane, the cam 55 is always maintained in its same relationship with respect to the blocks 54 carried by the free ends of the arms, as these blocks are held normally in rather rigid engagement with the cam 55 by reason of the adjustment of the bolt 37 at the fulcrum connection. The nut 62 is then tightened upon the bolt 57 which brings the serrated washers 63 into engagement with the ends of the cam 55 and adjacent surfaces of the free ends 59 of the drag link so that the cam 55 moves as an integral part with the drag link.

Upon the compression stroke between the chassis and axle of the motor vehicle, the friction member 27 is moved in a counter-clockwise direction, as indicated by the arrow marked C. This movement causes the upper end of the drag link 58 to be moved inwardly to the line marked C and R. As the cam 55 is rigidly secured to the drag link it is moved relatively with respect to the free ends of the arms 30 and 30a about the axis of the bolt 57 which causes the free ends to be increasingly separated. The movement of the free ends of the arms is fulcrumed at the connection provided by the bolt 37, with the result that the friction member 27 is likewise correspondingly moved into engagement with the friction band 24. This movement is accentuated by means of the jointed connection 42 which tends to move the associated end of the arm 30a into engagement with the friction band 24. The frictional resistance offered between the friction member 27 and the friction band 24 during this compression movement, is not so great as during the rebound movement, by reason of the fact that the friction member 27 does not have the tendency to wrap around the friction band 24. Furthermore, the amount of frictional resistance offered between the friction member 27 and the friction band 24 during the compression stroke is less than during the rebound stroke, by reason of the difference in the angular position of the drag link and the arms of the friction member 27. For example, if the friction member 27 is oscillated approximately 45° or to a position indicated by the dot and dash line marked C, the movement of the drag link to the line marked C and R is approximately 20°. Therefore, the difference in the angular relationship of the friction member 27 and the drag link 58 is about 25°.

In the rebound stroke, where greater frictional resistance is desired, the friction member 27 is moved in a clockwise direction, as indicated by the arrow marked R. The upper end of the drag link 58 is again moved inwardly to a position indicated by a line marked C and R and, as a result, the cam 55 progressively increases the distance between the ends of the arms 30 and 30a. This movement takes place about the fulcrum connection afforded by the bolt 37 and causes the friction member 27 to be increasingly moved into engagement with the friction band 24. In this instance, the jointed connection 42 moves the cooperating end of the arm 30a into engagement with the friction band 24 and the friction member 27 has a tendency to wrap itself around the friction band 24. However, a greater frictional resistance is offered to the rebound stroke by reason of the greater angular change between the arms of the friction member 27 and the drag link 58. Assuming again that the rebound stroke is such as to oscillate the friction member 27 approximately 45° to a position in which the arms 30 and 30a assume a position indicated by the dot and dash line marked R, the upper end of the drag link is then moved inwardly to a position indicated by the dot and dash line marked C and R which again is approximately 20°. In this relationship however, the angle between these members is an obtuse angle of approximately 65° so that it will be readily seen that a greater frictional resistance is offered to the rebound stroke where it is desirable, than to the compression stroke. The construction is also such that slight irregularities in roads which are transmitted to the shock absorber are dampened to a sufficient extent to maintain the body of the motor vehicle in smooth riding condition.

In Figs. 7 to 10, inclusive, a modification of a shock absorber is illustrated but embodying the same invention. In this instance, the drum 121 has a smooth outer surface to which is riveted or otherwise secured a friction band 124 which may have its ends terminating short of each other or be continuous, as illustrated in Fig. 1. In this particular instance, the drum and friction band are intended to be an integral unit for replacement as a whole, as the cost of the drum is negligible. The expansible and contractible friction member 127 comprises cooperating half sections flexibly or pivotally connected to an arcuate shaped connecting member 82 having depending flanges 83 extending upon opposite sides thereof and adjacent the outer edges of the friction member 127, as more clearly shown in Fig. 8. One end of the half sections is looped to provide hooks 84 which extend through a suitable opening 85 in the connecting member 82 and engage the surfaces adjacent the opposite edges of the opening, as clearly shown in Fig. 7. This double flexible connection responds more quickly to the vibrations or relative movements of the chassis of the motor vehicle. A strip of resilient material 85' of brake lining or rubberized material may be disposed between the connecting member 82 and the inner side of the housing, as shown in Fig. 7.

It is desirable in some instances to provide a means for adjusting the relative position of the arms 30 and 30a to compensate for the normal amount of wear upon the brake band 124 by reason of its frictional engagement with the friction member 127 and, likewise, between the cam 55 and the bearing 54. This may be obtained by providing a right and left screw threaded pin 137 extending through suitable openings in the arms 30 and 30a, the outer ends of which are disposed within openings in non-metallic washers 136 supported within cup-shaped members 135, the lower ends of which are reduced and secured within the openings in the arms 30 and 30a. Nuts 140 engage the screw threaded ends of the rod 137 and are held against rotation by means of lock washers 141. A double grooved pulley wheel 86 is pinned at 87 or otherwise permanently attached to the rod 137 and normally disposed between the arms 30 and 30a. A cable 88 is wrapped about the pulley wheel 86 and disposed within the grooves, while the ends extend forwardly and engage with a guide 89 secured to the inside of the shock absorber housing. The ends of the cable extend around a curved portion 90 of the member 89 and through spaced openings 100 provided in a resilient member 101 of brake lining or other rubberized material. The member 101 is secured within an opening provided in the closed end of the drum and the ends of the cable may be attached at a remote location to an operating knob or other operating device, such as for instance, upon the dash of the motor vehicle. Rotation of the pulley wheel by means of the cable in one direction causes the arms 30 and 30a to be separated and thereby decreases the frictional resistance afforded between the friction member 127 and the friction band 124, while movement in the opposite direction causes the arms 30 and 30a to be moved in closer proximity with the result that the frictional resistance is increased.

This construction affords manual adjustment of the shock absorber so that the frictional resistance may be adjusted to suit the individual requirements.

In Figs. 11 and 12, a further modification of a connection between the ends of the cooperating half sections is disclosed, the ends being looped at 84 and cooperating with the looped ends 102 of a connecting member 103 which is normally slidable transversely to engage or disengage the looped ends. The central portion of the connecting member may be depressed so as to render the connection more rigid and a cover member 104 extends over the connection to prevent disengagement. This cover member has a flanged opening through which the connection extends and a pin 105 is secured within the aligned openings provided in the side of the housing member 104 to hold the housing in proper position.

In Figs. 13 to 16, inclusive, a further modification of the shock absorber is illustrated. In this instance, the drum 221 has a continuous friction band 224 riveted or otherwise secured thereto which is engageable with a friction member 227. This friction member is expansible and contractible in a manner similar to the friction member 27 and comprises cooperating half sections. The one end of the half sections laterally extending members 228 are provided and have aligned openings 106 through which extends a housing 108 of an automatic adjusting device 107. The housing has right and left hand threads at the opposite ends with which engage exteriorly screw threaded sleeves 109 and 110 respectively. The upper end of spring 115 is prevented from rotation by means of an L-shaped member 111 having one leg disposed within a longitudinally extending groove 112, while the other leg is pinned at 113 or otherwise secured within a transverse slot in the upper end of a pin 114. The lower end of the pin extends inwardly within the housing and is fixed within the inner wall thereof to receive the coiled torsion spring 115 which encircles the pin 114. The upper end of the spring abuts a screw threaded plug 116 in the upper portion of the housing, while the lower end of the spring engages a depressible member 117 pinned or otherwise secured within the lower end of the housing. Both the sleeves 109 and 110 are prevented from rotation with respect to said laterally extending members 228 by interengaging connections 118. The depressible member 117 is provided with a transverse slot 119 adapted to receive a screw driver or other suitable instrument and by which the spring 115 may be wound up and held under tension by a pin 117' engaging slots in the lower end of the housing 107. As the spring 115 is always under tension, there is a tendency to rotate the interiorly screw threaded housing 107 to thereby move the arms 228 toward each other. This construction automatically compensates for any wear occuring between the friction member 227 and the friction band 224.

The arms 230 extend laterally but, in this modification, no jointed connection or fulcrum point is required. The end of the upper arm 230 is riveted or otherwise secured at 220 with the overlapping ends 231 of a box-shaped member 232. The free end of the lower arm 230 is provided with depending flanges 233 upon its under side which receive therein a resilient block 234 of brake lining or suitable rubberized material, the flanges being pressed inwardly to secure the block against displacement. A U-shaped member 235 is disposed within the lower portion of the housing and is adapted to support a resilient block 236 of brake lining or suitable rubberized material, the other sides of the block 236 being disposed within the lower portion of the box-shaped member 232, as more clearly shown in Fig. 14. The adjacent surfaces of the block 234 and 236 are spaced apart slightly, as shown in Fig. 13 and are grooved to receive a cam 237 secured to the upper end of a drag link 238. The lower block 236 is cut away at its lower portion at 239 to provide sufficient clearance for the movement of the upper end of the drag link in the operation of the shock absorber.

In the operation of the shock absorber embodying this modification, upon the compression stroke between the chassis and axle of the motor vehicle, the friction member 227 is rotated in a counterclockwise direction which causes the cam 231 upon the drag link to be moved in such a manner that the lower arm 230 is moved toward the upper stationary arm 230 effecting an increasing frictional resistance to the movement between the friction member 227 and the friction band 224. Upon the rebound stroke the friction member 227 is moved in a clockwise direction, but the cam 237, upon the end of the drag link 238, again moves the free arm 230 toward the stationary arm 230 with the result that an increasing frictional resistance is effected between the relative movement of the friction member 227 and the friction band 224. The frictional resistance created between the relative movements of the friction member 227 and the friction band 224 are the same as already described in connection with the pressure structure, there being greater frictional resistance offered to the rebound stroke than to the compression stroke by reason of the change in the angularity of the operating members.

While I have described the preferred embodiments of the invention, it is to be understood that I am not to be limited thereto as changes and modifications may be resorted to without departing from the spirit of the invention as defined in the appended claims.

Having thus described my invention, I claim:

1. In a shock absorber, a stationary drum, an oscillatory expansible and contractible friction member engageable with the outer surface of said drum and having laterally extending arms with free ends, fulcrum means for said arms, and means operatively connected with said free ends for moving the same relatively to move said friction member into engagement with said drum.

2. In a shock absorber, a stationary drum, an oscillatory expansible and contractible friction member engageable with the outer surface of said drum and having laterally extending arms with free ends, means coacting with said arms between the drum engaging part of said friction member and said free ends to prevent relative separation of the arms, and means operatively connected with said free ends for moving the same outward relatively to move said friction member into engagement with said drum.

3. In a shock absorber, a stationary drum, friction material attached to the outer surface of said drum, a concentric expansible and contractible friction member engageable with said drum and having laterally extending spaced arms with free ends, means coacting with said arms between the drum engaging part of said friction member and said free ends to prevent relative separation of the arms, and means operatively connected with said free ends for moving the same outwardly in opposite directions to cause said friction member to engage said friction material.

4. In a shock absorber, a stationary drum, friction material attached to the outer surface of said drum, a concentric expansible and contractible friction member engageable with said drum and having laterally extending spaced free ends, fulcrum means attached to said free ends, and means operatively connected with said free ends for separating the latter to cause said friction member to engage said friction material.

5. In a shock absorber, a stationary drum, friction material attached to the outer surface of said drum, a concentric expansible and contractible friction member engageable with said drum and having laterally extending spaced free ends, adjustable means attached to said free ends for maintaining the same in spaced relation, and means operatively connected with said free ends for separating the latter to cause said friction member to engage said friction material.

6. In a shock absorber, a stationary drum, a concentric expansible and contractible friction member adapted to engage said drum and having laterally extending spaced arms, one of said arms being pivotally jointed, means coacting with said arms between said friction member and the ends of said arms for preventing relative separation, and means operatively connected adjacent the ends of said arms for separating the latter to cause said friction member to engage said drum.

7. In a shock absorber, a stationary drum, a concentric expansible and contractible friction member adapted to engage said drum and having laterally extending spaced arms, one of said arms being pivotally jointed, means attached to said arms between said pivoted joint and the ends of said arms for maintaining the latter in spaced relation, and means operatively connected with the ends of said arms for separating the latter to cause said friction member to engage said drum.

8. In a shock absorber, a stationary drum, a concentric expansible and contractible friction member adapted to engage said drum and having laterally extending spaced arms, one of said arms being pivotally jointed, adjustable means attached to said arms between said pivoted joint and the ends of said arms for maintaining the latter in spaced relation, and means operatively connected with the ends of said arms for separating the latter to cause said friction member to engage said drum.

9. In a shock absorber, a stationary drum, a concentric expansible and contractible friction member adapted to engage said drum and having laterally extending arms, one of said arms being pivotally jointed, fulcrum means connecting said arms between said joint and the ends of said arms, and means operatively connected with the ends of said arms and movable about a transverse axis for separating said arms to cause said friction member to engage said drum.

10. In a shock absorber, a stationary drum, a concentric expansible and contractible friction member adapted to engage said drum and having laterally extending arms, one of said arms being pivotally jointed, fulcrum means connecting said arms between said joint and the ends of said arms, and means operatively connected with the ends of said arms for progressively increasing the distance between said arms to cause said friction member to increasingly engage said drum.

11. In a shock absorber, a stationary drum, a concentric expansible and contractible friction member adapted to engage said drum and having laterally extending arms, one of said arms being pivotally jointed, fulcrum means connecting said arms between said joint and the ends of said arms, and means operatively connected with the ends of said arms and movable about a transverse axis for progressively increasing the distance between said arms to cause said friction member to increasingly engage said drum in different proportions.

12. In a shock absorber, a stationary drum, a concentric expansible and contractible friction member engageable with said drum and having laterally extending arms, a drag link having one end operatively connected with the ends of said arms and movable about a transverse axis to cause said friction member to increasingly engage said drum, and a non-metallic connection between said arms and said drag link.

13. In a shock absorber, a stationary drum, a concentric expansible and contractible friction member engageable with said drum and having laterally extending arms, a drag link having one end operatively connected with the ends of said arms and movable about a transverse axis to cause said friction member to increasingly engage said drum in different proportions throughout their relative movements in opposite directions, and a non-metallic connection between said arms and said drag link.

14. In a shock absorber, a stationary drum adapted to be connected with the chassis of a motor vehicle, a friction band attached to the outer side of said drum, a concentric expansible and contractible friction member movable in opposite directions about the axis of said drum and engageable with said friction band, said friction member having laterally extending arms, one of which is pivotally jointed, means connecting said arms for maintaining the latter in spaced relation, resilient members carried by the ends of said arms, and a drag link having one end operatively connected with said resilient members and movable about a transverse axis for progressively increasing the distance between said arms to cause said friction member to increasingly engage said friction band in different proportions as said friction member and band are moved relatively in opposite directions.

15. In a shock absorber, a stationary drum adapted to be connected to the chassis of a motor vehicle, a friction band attached to the outer side of said drum, a concentric expansible and contractible friction member movable in opposite directions about the axis of said drum and engageable with said friction band, said member comprising a pair of cooperating sections hingedly connected at one end and having laterally extending arms at the other, one of which is pivotally jointed, means connecting said arms for maintaining the latter in spaced relation, resilient members carried by the ends of said arms, and a drag link having one end operatively connected with said resilient members and movable about a transverse axis for progressively increasing the distance between the ends of said arms to cause said friction member to increasingly engage said friction band in different proportions as said friction member and band are moved relatively in opposite directions.

16. In a shock absorber, a stationary drum, a concentric expansible and contractible friction member movable in opposite directions about the axis of said drum and engageable with the latter, said member having laterally extending arms, and a drag link having one end operatively connected with the ends of said arms, said connection comprising resilient members carried by said arms, a bolt carried by the upper end of said drag link, a cam loosely mounted on said bolt, a serrated washer between one end of said cam and the adjacent side of said drag link, and a nut engageable with said bolt for drawing said link and cam rigidly into engagement with said serrated washer.

17. In a shock absorber, a stationary drum, a concentric expansible and contractible friction member movable in opposite directions about the axis of said drum and engageable with the latter, said member having laterally extending arms, and a drag link having one end operatively connected with the ends of said arms, said connection comprising resilient members carried by said arms, a bolt carried by the upper end of said drag link, a cam loosely mounted on said bolt, a pair of serrated washers between the ends of said cam and the adjacent sides of said drag link, and a nut engageable with said bolt for drawing said link and cam rigidly into engagement with said serrated washers.

18. In a shock absorber, a stationary drum, a concentric expansible and contractible friction member adapted to engage said drum and having laterally extending spaced arms, one of said arms being pivotally jointed, means attached to said arms between said pivoted joint and the ends of said arms for maintaining the latter in spaced relation and adjustable from a remote location, and means operatively connected with the ends of said arms for separating the latter to cause said friction member to engage said drum.

19. In a shock absorber, a stationary drum having a serrated outer surface, a friction band carried by said drum and prevented from relative movement by said serrations, a concentric expansible and contractible friction member movable in opposite directions about the axis of said drum and engageable with the latter, said member having laterally extending arms, and means operatively connected with said arms for moving the same relatively to cause said friction member to increasingly engage said friction band in different proportion throughout their relative movements in opposite directions.

JACOB R. SNYDER.